US012694327B2

(12) United States Patent
Sen et al.

(10) Patent No.: US 12,694,327 B2
(45) Date of Patent: Jul. 28, 2026

(54) AUTOMATED FEW-SHOT LEARNING TECHNIQUES FOR ARTIFICIAL INTELLIGENCE-BASED QUERY ANSWERING SYSTEMS

(71) Applicant: International Business Machines Corporation, Armonk, NY (US)

(72) Inventors: Jaydeep Sen, Bangalore (IN); Saneem Ahmed Chemmengath, Bangalore (IN); Vishwajeet Kumar, Bangalore (IN); Samarth Bharadwaj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1098 days.

(21) Appl. No.: 17/549,201

(22) Filed: Dec. 13, 2021

(65) Prior Publication Data

US 2023/0186147 A1 Jun. 15, 2023

(51) Int. Cl.
*G06N 20/00* (2019.01)
*G06F 16/3329* (2025.01)
(Continued)

(52) U.S. Cl.
CPC ......... *G06N 20/00* (2019.01); *G06F 16/3329* (2019.01); *G06N 3/0455* (2023.01); *G06N 5/04* (2013.01); *G06F 16/335* (2019.01)

(58) Field of Classification Search
CPC ........ G06N 20/00; G06N 5/04; G06N 3/0455; G06F 16/3329; G06F 16/335
See application file for complete search history.

(56) References Cited

U.S. PATENT DOCUMENTS 8,756,245 B2 * 6/2014 Imielinski ............. G06F 16/243
                                                       707/769
10,963,754 B1 * 3/2021 Ravichandran ........ G06N 3/084
(Continued)

FOREIGN PATENT DOCUMENTS

CN      112214654 A      1/2021
CN      112668344 A      4/2021
(Continued)

OTHER PUBLICATIONS

Tan et al., A critical look at the current train test split in machine learning, 2021 (Year: 2021).*
(Continued)

*Primary Examiner* — James T Tsai
(74) *Attorney, Agent, or Firm* — Ryan, Mason & Lewis, LLP

(57) ABSTRACT
Methods, systems, and computer program products for automated few-shot learning techniques for artificial intelligence-based query answering systems are provided herein. A computer-implemented method includes obtaining multiple sets of queries and answers associated with one or more tables; determining a level of complexity attributed to at least a portion of the queries from the multiple sets of queries and answers; determining, based at least in part on the determined level of complexity attributed to the at least a portion of the queries, one or more new queries for use in training at least one artificial intelligence-based query answering system; facilitating annotation of the one or more new queries; training the at least one artificial intelligence-based query answering system using at least a portion of the one or more annotated new queries; and performing at least one automated action using the at least one trained artificial intelligence-based query answering system.

19 Claims, 6 Drawing Sheets

(51) Int. Cl.
     *G06F 16/335*     (2019.01)
     *G06N 3/0455*     (2023.01)
     *G06N 5/04*       (2023.01)

(56)                References Cited

U.S. PATENT DOCUMENTS

| | | | | |
|---|---|---|---|---|
| 11,449,527 | B2 * | 9/2022 | Jetcheva | G06F 16/285 |
| 11,741,296 | B2 * | 8/2023 | Madaan | G06N 3/047 |
| | | | | 704/9 |
| 12,159,230 | B2 * | 12/2024 | Sun | G06N 3/045 |
| 2007/0022109 | A1 | 1/2007 | Imielinski et al. | |
| 2016/0019280 | A1 * | 1/2016 | Unger | G06F 16/3329 |
| | | | | 707/736 |
| 2019/0034514 | A1 | 1/2019 | Jetcheva et al. | |
| 2020/0257679 | A1 | 8/2020 | Sheinin et al. | |
| 2021/0011934 | A1 * | 1/2021 | Boxwell | G06F 16/3329 |
| 2021/0279232 | A1 | 9/2021 | Kim | |
| 2021/0326742 | A1 * | 10/2021 | Rosset | G06N 20/00 |
| 2021/0342399 | A1 | 11/2021 | Sisto et al. | |
| 2023/0177363 | A1 * | 6/2023 | Li | G06N 5/02 |
| | | | | 706/45 |
| 2023/0186147 | A1 * | 6/2023 | Sen | G06N 20/00 |
| | | | | 706/12 |

FOREIGN PATENT DOCUMENTS

| | | | |
|---|---|---|---|
| CN | 113220881 | A | 8/2021 |
| CN | 113377936 | A | 9/2021 |
| CN | 113220881 | | 11/2021 |
| TW | 201944266 | | 11/2019 |
| TW | 201944266 | A | 11/2019 |
| TW | M612209 | | 5/2021 |
| TW | M612209 | U | 5/2021 |
| TW | I873453 | B | 2/2025 |
| WO | 2019/203156 | A1 | 10/2019 |
| WO | 2023/111748 | A1 | 6/2023 |

OTHER PUBLICATIONS

Le, Exploiting Text Corpora for Data Enrichment in Language and Vision Applications, (2014) (Year: 2014).*

Sachan et al., Easy Questions First A Case Study on Curriculum Learning for Question Answering, (2016) (Year: 2016).*

Weir et al., DBPal A Fully Pluggable NL2SQL Training Pipeline, Jun. 2020 (Year: 2020).*

Iacob et al., Neural Approaches for Natural Language Interfaces to Databases—A Survey, (2020) (Year: 2020).*

Obaido et al., TalkSQL A Tool for the Synthesis of SQL Queries, (2020) (Year: 2020).*

Benfenatki et al., Service-Oriented Architecture for Cloud Application Development, 2014 (Year: 2014).*

Kano et al., Structured-based Curriculum Learning for E2E English-Japanese Speech Translation, 2018 (Year: 2018).*

Macaire, Recognizing lexical units in low-resource language contexts with supervised and unsupervised neural networks, 2021 (Year: 2021).*

Katsis et al., AIT-QA: Question Answering Dataset over Complex Tables in the Airline Industry, ARVIX, Jun. 24, 2021.

Ram et al., Few-Shot Question Answering by Pretraining Span Selection, Proceedings of the 59th Annual Meeting of the Association for Computational Linguistics and the 11th International Joint Conference on Natural Language Processing, Aug. 2021.

Park et al., Korean TableQA: Structured data question answering based on span prediction style with S3-NET, ETRI Journal, Jul. 26, 2020.

Sachan et al., Easy Questions First? A Case Study on Curriculum Learning for Question Answering, Proceedings of the 54th Annual Meeting of the Association for Computational Linguistics, Aug. 2016.

Kratzwalk et al., Learning a Cost-Effective Annotation Policy for Question Answering, ARXIV, Nov. 8, 2020.

* cited by examiner

AUTOMATED FEW-SHOT LEARNING TECHNIQUES FOR ARTIFICIAL INTELLIGENCE-BASED QUERY ANSWERING SYSTEMS

BACKGROUND

The present application generally relates to information technology and, more particularly, to data processing techniques. More specifically, challenges exists with respect to few-shot learning. As used herein, few shot learning generally refers to scenarios wherein, for a machine learning application, the test domain is different from the domain that the given machine learning model was trained on, and only a limited number of examples are available for fine-tuning the machine learning model to the test domain. However, user annotation is an expensive but necessary aspect of conventional approaches with respect to query answering systems.

SUMMARY

In at least one embodiment, techniques for automated few-shot learning techniques for artificial intelligence-based query answering systems are provided. An example computer-implemented method includes obtaining multiple sets of queries and answers associated with one or more tables, determining a level of complexity attributed to at least a portion of the queries from the multiple sets of queries and answers, and determining, based at least in part on the determined level of complexity attributed to the at least a portion of the queries, one or more new queries for use in training at least one artificial intelligence-based query answering system. The method also includes facilitating annotation of the one or more new queries, training the at least one artificial intelligence-based query answering system using at least a portion of the one or more annotated new queries, and performing at least one automated action using the at least one trained artificial intelligence-based query answering system.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, at least one embodiment includes automated few-shot learning techniques for artificial intelligence-based query answering systems. For example, such an embodiment includes implementing conditional query complexity for intelligent few-shot learning techniques in connection with artificial intelligence-based query answering systems (e.g., TableQA systems). As used herein, conditional query complexity refers to the complexity of a natural language query with respect to a specific table (i.e., conditioned on the input table). Note, for example, that the same natural language query can have different complexities when conditioned on two differently structured tables, and thus it is different from the traditional perplexity measures obtained from natural language modeling.

One or more such embodiments can include generating and/or implementing automated few-shot learning techniques for artificial intelligence-based query answering systems, wherein the techniques automatically select and/or generate a minimal yet optimal set of questions for annotation. Such an embodiment includes using one or more machine learning techniques such as, for example, curriculum learning, in connection with a given artificial intelligence-based query answering system. As used herein, curriculum learning includes a possible application of conditional query complexity measure, wherein training examples are divided into batches depending on an increasing level of conditional query complexity, such that the model can be trained on simple-to-moderate-to-complex queries and becomes robust on the entire dataset. Such an embodiment can also include using at least one conditional question complexity measure conditioned on a given table, as well as using at least one conditional question complexity measure for designing one or more intelligent curriculum learning schemes.

By way merely of illustration, consider an example scenario which includes input of a given artificial intelligence-based query answering system (e.g., a TableQA system) S, and a set of <natural language query Q, table T>pairs (QTs), and a desired output of a few-shot learning question set (e.g., fewQTs ⊂ QTs such that training S on fewQTs can provide a satisfactory overall performance on QTs). As further detailed herein, one or more embodiments include implementing an intelligent few-shot learning paradigm for artificial intelligence-based query answering systems which includes intelligently determining and/or selecting a given number (e.g., K) of specific queries to be annotated (e.g., by a domain expert and/or automatically by an automated software program) instead of relying on a random and/or naive number of examples provided manually by a given user. In such an embodiment, the determined and/or selected specific queries (e.g., K examples) are determined and/or selected to boost the given artificial intelligence-based query answering system for handling one or more new types of queries.

Figure 1:
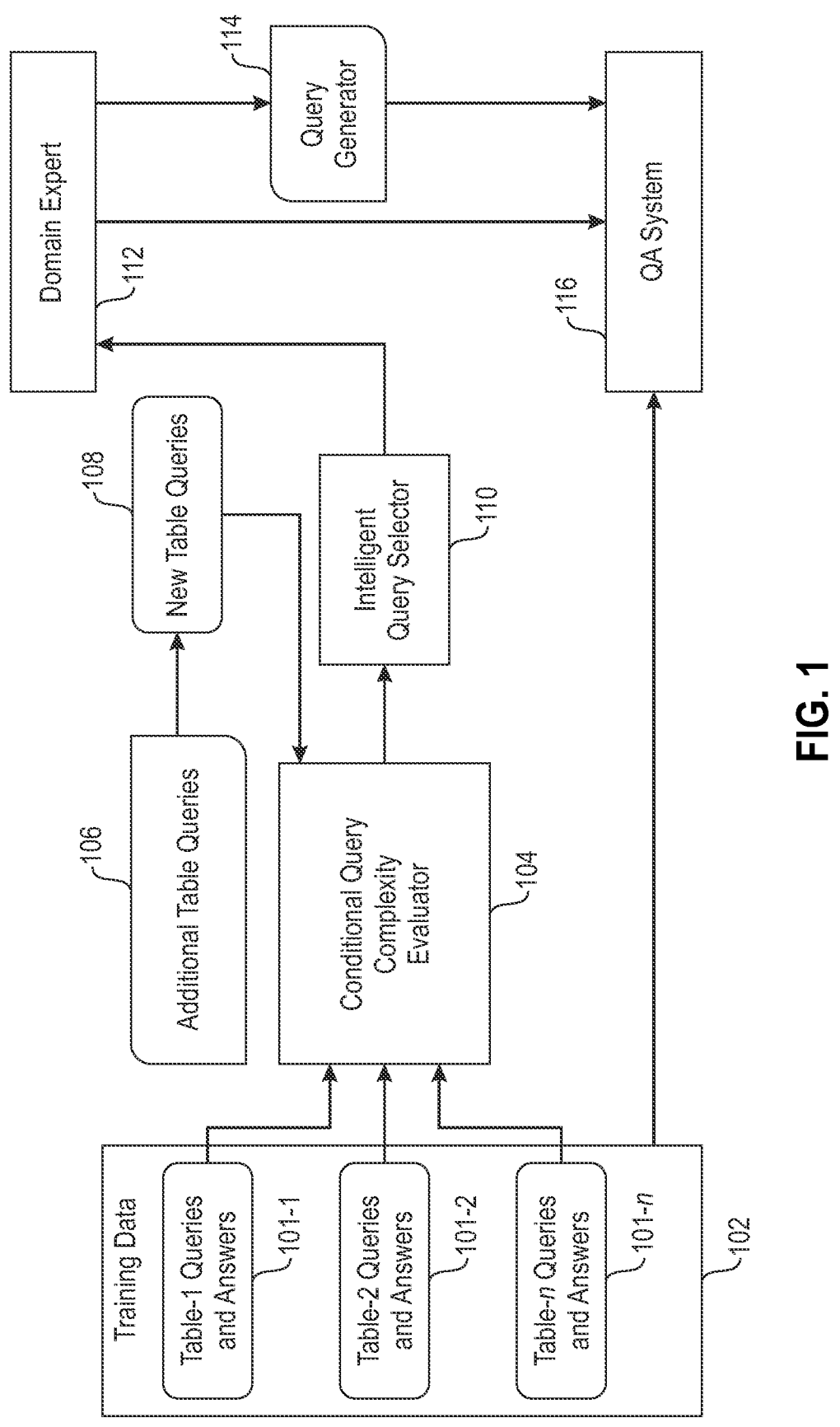
FIG. 1 is a diagram illustrating system architecture, according to an example embodiment of the invention.

FIG. 1 is a diagram illustrating system architecture, according to an embodiment of the invention. By way of illustration, FIG. 1 depicts training data 102, which includes table-1 queries and answers 101-1, table-2 queries and answers 101-2 and table-n queries and answers 101-n, which are used to train artificial intelligence-based query answering (QA) system 116 as well as provided as input to conditional query complexity evaluator 104. Additionally, new table queries 108, derived from one or more sets of additional table queries 106 (wherein such queries can be derived from one or more user inputs, from processing one or more query logs, and/or via use of one or more artificial intelligence techniques (e.g., self-supervision query generation and/or curriculum learning), etc.), are also provided as input to conditional query complexity evaluator 104.

As also depicted in FIG. 1, conditional query complexity evaluator 104, based at least in part on processing at least a portion of the above-noted inputs, generates an output pertaining to query complexity and provides such an output to intelligent query selector 110. The output from the conditional query complexity evaluator 104 is meant to measure or quantify the level of complexity of the query, given the input table. In at least one embodiment, such an output can include a binary string as obtained from some explicit feature engineering, wherein each bit captures a certain dimension of the query (e.g., a first bit represents a mention of a select clause, a second bit represents an aggregation, a $k^{th}$ bit represents a numeric comparison, etc.). In one or more other embodiments, such an output can include a continuous embedding learned from a machine learning approach with the same end goal that two similar queries will have similar embedding even if the queries sound different, whereas two similar sounding queries might have very different embedding if their complexity levels are different. Based at least on such output(s), intelligent query selector 110 determines and/or identifies one or more new types of queries to be used in connection with few-shot learning techniques, and outputs at least a portion of such new queries to domain expert 112 for annotation.

In one or more embodiments, domain expert 112 annotates and/or answers only the new types of queries for few-shot learning techniques, and provides such output(s) to query generator 114. The query generator 114 can include, for example, a cloze-based self-supervision query generator. As used herein, a cloze-based self-supervision method typically includes masking parts of input sentences and generating questions which would have the masked part as an answer. Such a context can generally include generating similar queries as the query that the domain expert provided by replacing, adding, and/or omitting one or more of the parameters mentioned in the query. Additionally, query generator 114 generates one or more queries which are then used to further train QA system 116.

Figure 2:
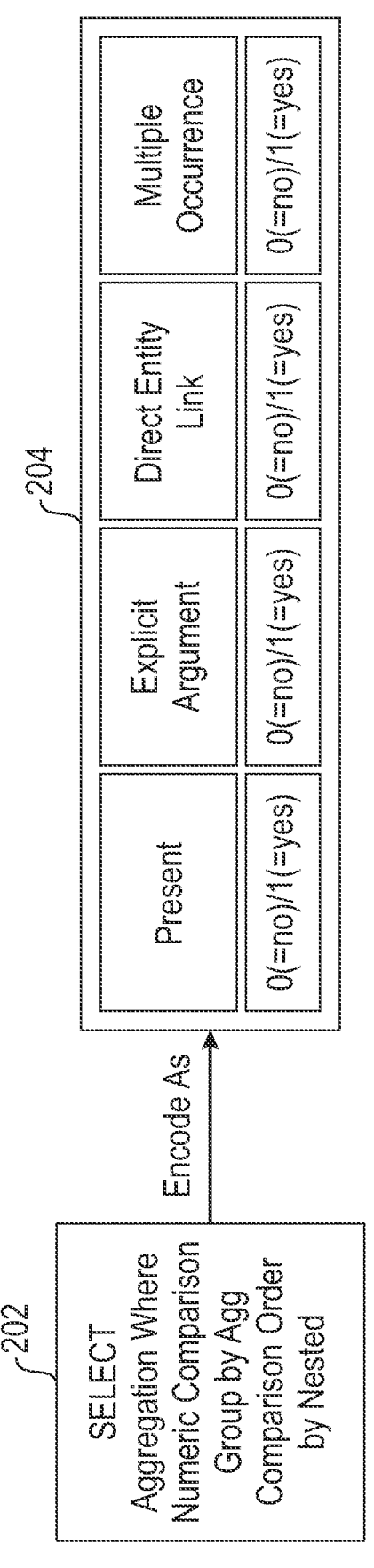
FIG. 2 is a diagram illustrating explicit feature engineering, according to an example embodiment of the invention.

FIG. 2 is a diagram illustrating explicit feature engineering, according to an example embodiment of the invention. By way of illustration, FIG. 2 depicts an example embodiment which includes conditional complexity evaluation through explicit feature engineering. Specifically, FIG. 2 depicts different feature vectors for different structured query language (SQL) query clauses 202 such as SELECT, AGGR, WHERE, GROUP BY, AGG COMPARISON, ORDER BY, and NESTED. Each dimension is represented by four bits 204, wherein each bit captures a different dimension (e.g., bit 1 captures whether that clause is present or not, bit 2 captures whether the argument of the clause was explicitly mentioned or not, bit 3 captures whether the element was directly mentioned in the query or needed to be inferred, and bit 4 captures whether there was a single occurrence or multiple occurrences of the clause (arguments)). It is to be appreciated that the embodiment depicted in FIG. 2 merely represents an example embodiment, and one or more other embodiments can include designing features differently and/or capturing a different set of dimensions while defining feature vectors. In any event, an objective of such embodiments includes using explicitly designed feature vectors to decide whether two or more queries are of similar complexity.

As detailed herein, one or more embodiments include creating conditional question embedding. As used herein, an embedding refers to a feature vector comprising continuous variables in $[-1,1]$, such as, for example, typically seen as outputs from bidirectional encoder representations from transformers (BERT) and/or other neural network-based training paradigms. Such an embodiment includes a training phase, which includes learning a conditional embedding model $M_{Q|T}$ of one or more given query-table pairs (Q|T), wherein such learning can be carried out, for example, via the following operation and/or task: isSimilarComplexity (Q1|T1, Q2|T2)=0/1. Such an embodiment also includes a runtime phase, which, given a new query-table pair ($Q_{new}$ |$T_{new}$), includes using $M_{Q|T}$ to generate at least one embedding of $Q_{new}$|$T_{new}$. Additionally, such an embodiment can include selecting at least one few-shot learning example, wherein $Q_{new}$|$T_{new}$ can be included as a few-shot learning example if: ∀q|t∈training_data: isSimilaryComplexity(q|T, $Q_{new}$|$T_{new}$)=0. In other words, none of the questions (q) seen in the training data on Table T have the same complexity level as the new question $Q_{new}$ asked on Table $T_{new}$, so the similarity measure outputs 0.

As also detailed herein, one or more embodiments (e.g., FIG. 1) include implementing an intelligent query selector. In such an embodiment, once question-table pairs are provided with the measured complexity, an intelligent query selector selects a subset of the question-table pairs and provides the subset to a domain expert to annotate with one or more answers and/or corresponding logical form(s). More specifically, the intelligent query selector can cluster groups of questions based on conditional complexity, and make the ultimate selection based at least in part on such clustering.

Further, in at least one embodiment, the intelligent query selector selects questions as a set and not individually. Additionally or alternatively, in one or more embodiments, the intelligent query selector selects questions based at least in part on how the existing artificial intelligence-based QA model performs on instances from the training data. For example, in such an embodiment, it may not be desirable and/or efficient to annotate instances on which the existing artificial intelligence-based QA model is expected to perform well.

Additionally, as described herein, one or more embodiments include implementing curriculum learning techniques for generating a robust QA system. In such an embodiment, designing curriculum learning techniques for training a given QA system can include ranking training samples based on complexity level predicted by the conditional query complexity evaluator. At least one embodiment can include starting training of the QA system with easier examples and gradually increasing complexity of the questions. Further, such an embodiment can include determining training instance distribution based at least in part on the curriculum learning techniques.

One or more embodiments can also include creating at least one language model for one or more given query-table pairs (Q|T). Such an embodiment can include a training phase, which includes learning a language model one or more given query-table pairs ($LM_{Q|T}$) by carrying out the following operation and/or task: generateSameComplexity-Query(Qs|T2,<Q1, T1>). Such an embodiment also includes a runtime phase, which, given a new query-table pair ($Q_{new}|T_{new}$), includes using $LM_{Q|T}$ to estimate the probability of generating $Q_{new}|T_{new}$ as follows: $P(Q_{new}|T_{new})$=(Max (q|t∈training_data: P(generateSameComplexityQuery ($Q_{new}|T_{new}$,<q, t>))). Accordingly, such an embodiment includes aiming to learn a language model of generating queries of the same complexity, given a table. With such a language model, one or more embodiments can include evaluating if the new query $Q_{new}$ can be generated on $T_{new}$ with the example Q-T pairs seen by the language model.

At least one embodiment also includes few-shot learning example selection, wherein $Q_{new}|T_{new}$ can be included as a few-shot learning example if: $P(Q_{new}|T_{new})$<a given threshold value.

Figure 3:
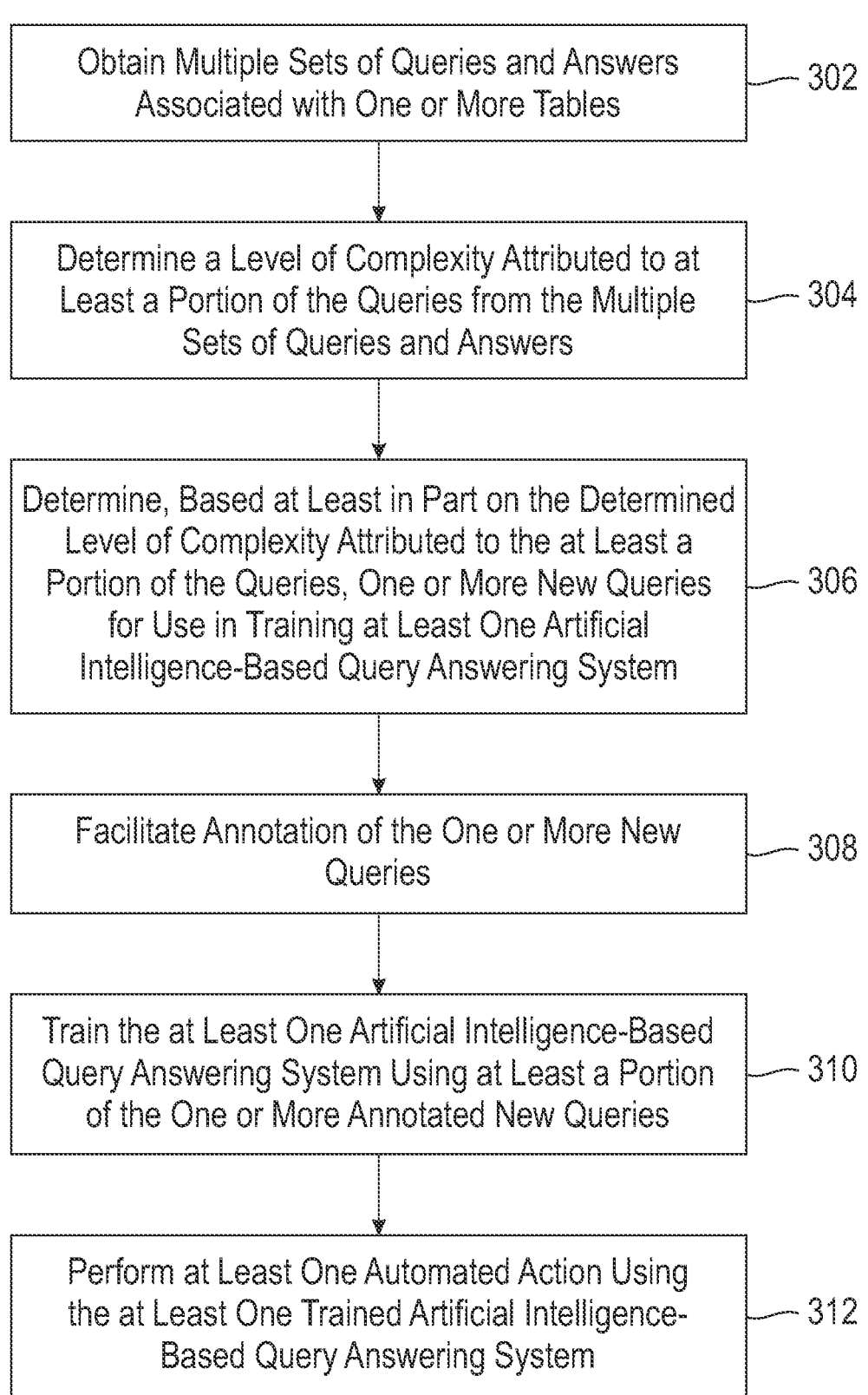
FIG. 3 is a flow diagram illustrating techniques according to an example embodiment of the invention.

FIG. 3 is a flow diagram illustrating techniques according to an embodiment of the present invention. Step 302 includes obtaining multiple sets of queries and answers associated with one or more tables. In at least one embodiment, obtaining multiple sets of queries and answers associated with one or more tables includes obtaining multiple table-related queries by processing one or more table query-related data sources using one or more artificial intelligence techniques. In such an embodiment, using one or more artificial intelligence techniques can include using at least one curriculum learning technique and/or using at least one self-supervision query generation technique.

Additionally or alternatively, obtaining multiple sets of queries and answers associated with one or more tables can include obtaining training data pertaining to each of multiple tables, wherein the training data for each of the multiple tables includes a set of table-specific queries and a set of corresponding answers, obtaining multiple table-related queries derived from one or more user inputs, and/or obtaining multiple table-related queries derived from processing one or more query logs.

Step 304 includes determining a level of complexity attributed to at least a portion of the queries from the multiple sets of queries and answers. Step 306 includes determining, based at least in part on the determined level of complexity attributed to the at least a portion of the queries, one or more new queries for use in training at least one artificial intelligence-based query answering system.

Step 308 includes facilitating annotation of the one or more new queries. In one or more embodiments, facilitating annotation of the one or more new queries can include obtaining annotations of the one or more new queries from one or more users and/or automatically annotating at least a portion of the one or more new queries using at least one automated software program.

Step 310 includes training the at least one artificial intelligence-based query answering system using at least a portion of the one or more annotated new queries. In at least one embodiment, training the at least one artificial intelligence-based query answering system using at least a portion of the one or more annotated new queries includes implementing one or more few-shot learning techniques.

Step 312 includes performing at least one automated action using the at least one trained artificial intelligence-based query answering system. In one or more embodiments, performing at least one automated action includes automatically answering one or more queries pertaining to at least a portion of the one or more tables using the at least one trained artificial intelligence-based query answering system.

In at least one embodiment, software implementing the techniques depicted in FIG. 3 can be provided as a service in a cloud environment.

Accordingly, as detailed herein, one or more embodiments include uniquely implementing a conditional query complexity measure conditioned on at least one input table. Such an embodiment can include, for example, using a few-shot QA and/or a curriculum learning system as applications of such conditional query complexity measures. Additionally, it is to be appreciated that such embodiments are generalizable to different QA systems (e.g., systems beyond TableQA), as one or more embodiments can include extending the notion of feature engineering to one or more other language clauses (e.g., SPARQL for knowledge graphs (KG), domain specific language (DSL) for ElasticSearch, etc.).

It is to be appreciated that "model," as used herein, refers to an electronic digitally stored set of executable instructions and data values, associated with one another, which are capable of receiving and responding to a programmatic or other digital call, invocation, or request for resolution based upon specified input values, to yield one or more output values that can serve as the basis of computer-implemented recommendations, output data displays, machine control, etc. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
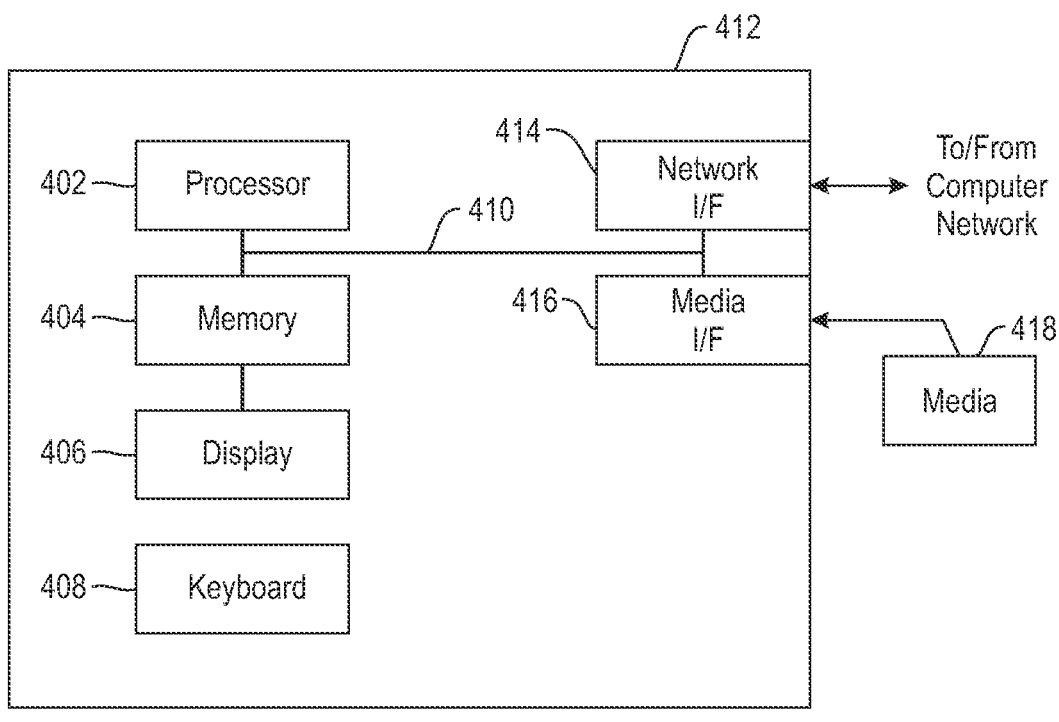
FIG. 4 is a system diagram of an example computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
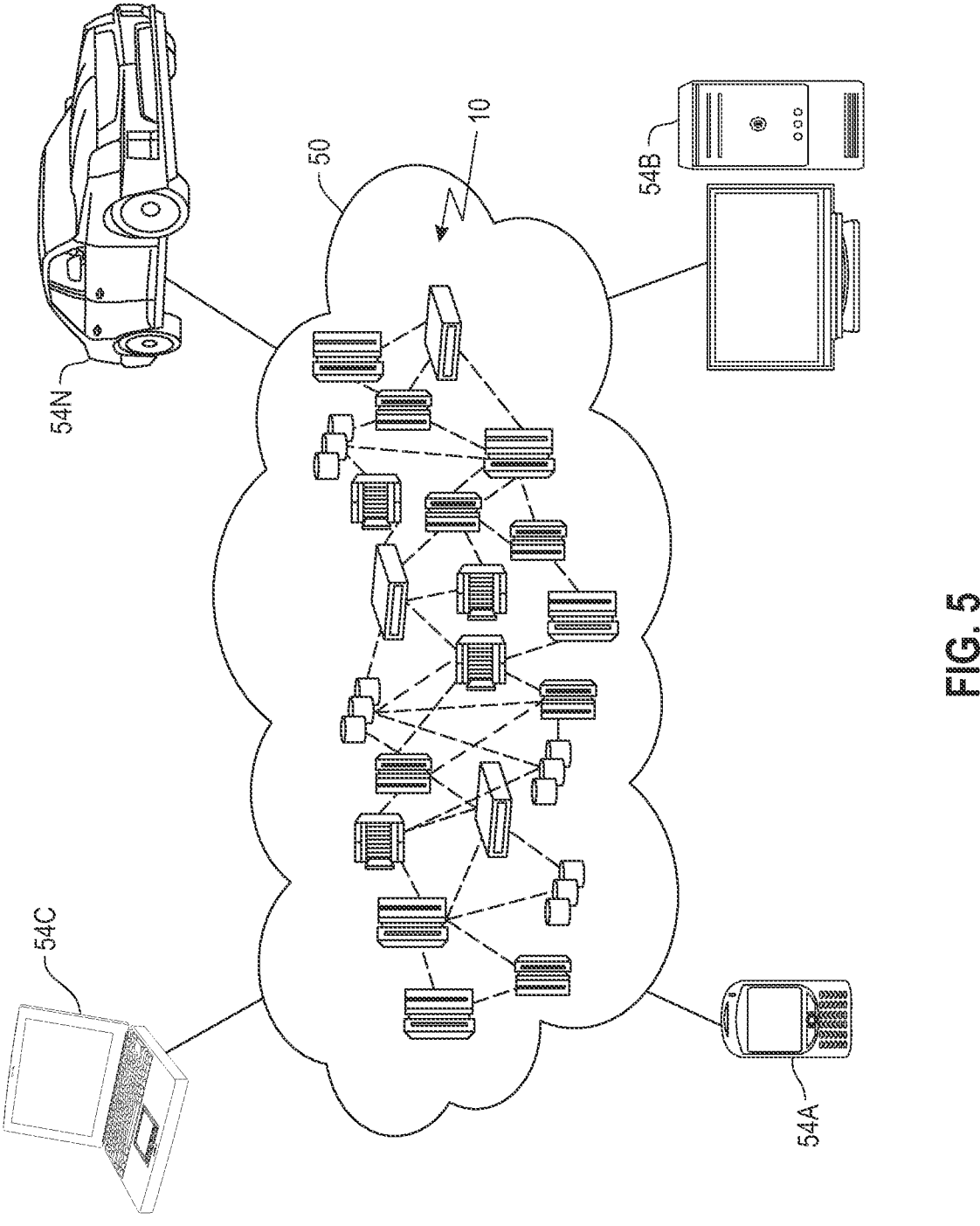
FIG. 5 depicts a cloud computing environment according to an example embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
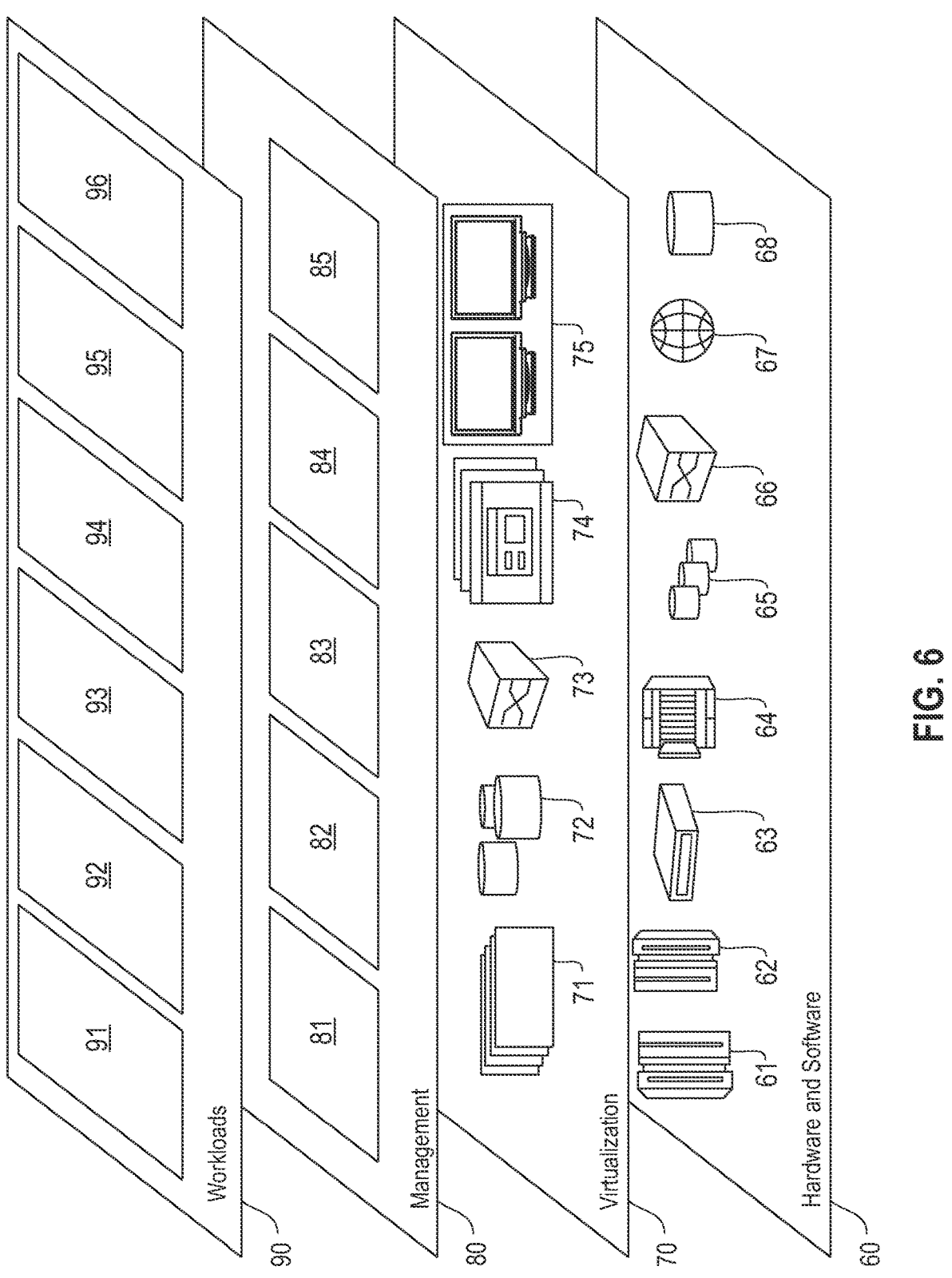
FIG. 6 depicts abstraction model layers according to an example embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated few-shot learning techniques 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, implementing automated few-shot learning techniques for artificial intelligence-based query answering systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

obtaining multiple sets of queries and answers associated with one or more tables, wherein obtaining multiple sets of queries and answers associated with one or more tables comprises: (i) obtaining queries, derived from processing one or more query logs, pertaining to at least a first set of two or more differently structured tables, (ii) obtaining queries, generated by one or more users, pertaining to at least a second set of two or more differently structured tables, and (iii) obtaining queries, pertaining to at least a third set of two or more differently structured tables, by processing one or more table query-related data sources using at least one curriculum learning technique;

determining a level of complexity attributed to at least a portion of the queries from the multiple sets of queries and answers;

determining, based at least in part on the determined level of complexity attributed to the at least a portion of the queries and performance by at least one artificial intelligence-based query answering system on one or more existing portions of training data, one or more new queries for use in training the at least one artificial intelligence-based query answering system, wherein the at least one artificial intelligence-based query answering system comprises at least one neural network-based query answering system;

facilitating annotation of the one or more new queries;

training the at least one artificial intelligence-based query answering system using at least a portion of the one or more annotated new queries, wherein training the at least one artificial intelligence-based query answering system comprises implementing one or more few-shot learning techniques in connection with the at least a portion of the one or more annotated new queries; and performing at least one automated action using the at least one trained artificial intelligence-based query answering system;

wherein the method is carried out by at least one computing device.

2. The computer-implemented method of claim 1, wherein using one or more artificial intelligence techniques comprises using at least one self-supervision query generation technique.

3. The computer-implemented method of claim 1, wherein facilitating annotation of the one or more new queries comprises obtaining annotations of the one or more new queries from at least a portion of the one or more users.

4. The computer-implemented method of claim 1, wherein performing at least one automated action comprises automatically answering one or more queries pertaining to at least a portion of the one or more tables using the at least one trained artificial intelligence-based query answering system.

5. The computer-implemented method of claim 1, wherein obtaining multiple sets of queries and answers associated with one or more tables comprises obtaining training data pertaining to each of multiple tables, wherein the training data for each of the multiple tables comprises a set of table-specific queries and a set of corresponding answers.

6. The computer-implemented method of claim 1, wherein facilitating annotation of the one or more new queries comprises automatically annotating at least a portion of the one or more new queries using at least one automated software program.

7. The computer-implemented method of claim 1, wherein software implementing the method is provided as a service in a cloud environment.

8. A computer program product comprising a computer readable storage medium having program instructions embodied therewith, the program instructions executable by a computing device to cause the computing device to:

obtain multiple sets of queries and answers associated with one or more tables, wherein obtaining multiple sets of queries and answers associated with one or more tables comprises: (i) obtaining queries, derived from processing one or more query logs, pertaining to at least a first set of two or more differently structured tables, (ii) obtaining queries, generated by one or more users, pertaining to at least a second set of two or more differently structured tables, and (iii) obtaining queries, pertaining to at least a third set of two or more differently structured tables, by processing one or more table query-related data sources using at least one curriculum learning technique;

determine a level of complexity attributed to at least a portion of the queries from the multiple sets of queries and answers;

determine, based at least in part on the determined level of complexity attributed to the at least a portion of the queries and performance by at least one artificial intelligence-based query answering system on one or more existing portions of training data, one or more new queries for use in training the at least one artificial intelligence-based query answering system, wherein the at least one artificial intelligence-based query answering system comprises at least one neural network-based query answering system;

facilitate annotation of the one or more new queries;

train the at least one artificial intelligence-based query answering system using at least a portion of the one or more annotated new queries, wherein training the at least one artificial intelligence-based query answering system comprises implementing one or more few-shot learning techniques in connection with the at least a portion of the one or more annotated new queries; and perform at least one automated action using the at least one trained artificial intelligence-based query answering system.

9. The computer program product of claim 8, wherein using one or more artificial intelligence techniques comprises using at least one self-supervision query generation technique.

10. The computer program product of claim 8, wherein facilitating annotation of the one or more new queries comprises obtaining annotations of the one or more new queries from at least a portion of the one or more users.

11. The computer program product of claim 8, wherein performing at least one automated action comprises automatically answering one or more queries pertaining to at least a portion of the one or more tables using the at least one trained artificial intelligence-based query answering system.

12. The computer program product of claim 8, wherein obtaining multiple sets of queries and answers associated with one or more tables comprises obtaining training data pertaining to each of multiple tables, wherein the training data for each of the multiple tables comprises a set of table-specific queries and a set of corresponding answers.

13. The computer program product of claim 8, wherein facilitating annotation of the one or more new queries comprises automatically annotating at least a portion of the one or more new queries using at least one automated software program.

14. A system comprising:

a memory configured to store program instructions; and a processor operatively coupled to the memory to execute the program instructions to:

obtain multiple sets of queries and answers associated with one or more tables, wherein obtaining multiple sets of queries and answers associated with one or more tables comprises: (i) obtaining queries, derived from processing one or more query logs, pertaining to at least a first set of two or more differently structured tables, (ii) obtaining queries, generated by one or more users, pertaining to at least a second set of two or more differently structured tables, and (iii) obtaining queries, pertaining to at least a third set of two or more differently structured tables, by processing one or more table query-related data sources using at least one curriculum learning technique;

determine a level of complexity attributed to at least a portion of the queries from the multiple sets of queries and answers;

determine, based at least in part on the determined level of complexity attributed to the at least a portion of the queries and performance by at least one artificial intelligence-based query answering system on one or more existing portions of training data, one or more new queries for use in training the at least one artificial intelligence-based query answering system, wherein the at least one artificial intelligence-based query answering system comprises at least one neural network-based query answering system;

facilitate annotation of the one or more new queries;

train the at least one artificial intelligence-based query answering system using at least a portion of the one or more annotated new queries, wherein training the at least one artificial intelligence-based query answering system comprises implementing one or more few-shot learning techniques in connection with the at least a portion of the one or more annotated new queries; and perform at least one automated action using the at least one trained artificial intelligence-based query answering system.

15. The system of claim 14, wherein using one or more artificial intelligence techniques comprises using at least one self-supervision query generation technique.

16. The system of claim 14, wherein facilitating annotation of the one or more new queries comprises obtaining annotations of the one or more new queries from at least a portion of the one or more users.

17. The system of claim 14, wherein performing at least one automated action comprises automatically answering one or more queries pertaining to at least a portion of the one or more tables using the at least one trained artificial intelligence-based query answering system.

18. The system of claim 14, wherein obtaining multiple sets of queries and answers associated with one or more tables comprises obtaining training data pertaining to each of multiple tables, wherein the training data for each of the multiple tables comprises a set of table-specific queries and a set of corresponding answers.

19. The system of claim 14, wherein facilitating annotation of the one or more new queries comprises automatically annotating at least a portion of the one or more new queries using at least one automated software program.

\* \* \* \* \*